(12) United States Patent
Nadeau et al.

(10) Patent No.: US 7,475,765 B2
(45) Date of Patent: Jan. 13, 2009

(54) SELF-ADJUSTING CONVEYOR SYSTEM

(75) Inventors: Erik Nadeau, Quebec (CA); Serge Coulombe, Boischatel (CA)

(73) Assignee: American Sterilizer Company, Mentor, OH (US)

( * ) Notice: Subject to any disclaimer, the term of this patent is extended or adjusted under 35 U.S.C. 154(b) by 0 days.

(21) Appl. No.: 11/765,652

(22) Filed: Jun. 20, 2007

(65) Prior Publication Data

US 2007/0297703 A1    Dec. 27, 2007

Related U.S. Application Data

(60) Provisional application No. 60/816,542, filed on Jun. 26, 2006.

(51) Int. Cl.
*B65G 13/00*    (2006.01)

(52) U.S. Cl. .......................................... 193/37; 198/780

(58) Field of Classification Search ................... 193/37; 198/780
See application file for complete search history.

(56) References Cited

U.S. PATENT DOCUMENTS

| 123,589 | A | | 2/1872 | Stearns |
|---|---|---|---|---|
| 289,910 | A | | 12/1883 | Grunder et al. |
| 700,509 | A | | 5/1902 | Knauber et al. |
| 2,145,343 | A | | 1/1939 | Dempsey ...................... 198/16 |
| 2,388,967 | A | | 11/1945 | Hathaway ..................... 193/37 |
| 2,528,116 | A | | 10/1950 | Clemson ....................... 56/249 |
| 3,651,911 | A | | 3/1972 | Kornylak ...................... 193/35 |
| 3,661,246 | A | * | 5/1972 | Faunce et al. ............... 198/806 |
| 3,734,491 | A | | 5/1973 | Beery et al. .................... 271/51 |
| 3,988,045 | A | * | 10/1976 | Coutant ....................... 384/587 |
| 4,006,810 | A | * | 2/1977 | Kornylak ...................... 193/37 |
| 4,105,264 | A | * | 8/1978 | Zimmermann et al. ....... 384/419 |
| 4,969,548 | A | * | 11/1990 | Kornylak .................. 193/35 R |
| 5,381,887 | A | * | 1/1995 | Emmons ...................... 198/830 |
| 5,454,460 | A | * | 10/1995 | Lane ............................. 193/37 |
| 5,660,489 | A | * | 8/1997 | Ishii et al. .................... 400/641 |
| 6,055,047 | A | * | 4/2000 | Schweizer et al. ........ 356/237.1 |
| 6,244,426 | B1 | * | 6/2001 | Murano et al. ............... 198/784 |
| 7,175,580 | B2 | * | 2/2007 | Wolff et al. ..................... 492/9 |
| 7,270,232 | B2 | * | 9/2007 | Schiltz ......................... 198/835 |

* cited by examiner

*Primary Examiner*—Douglas A Hess
(74) *Attorney, Agent, or Firm*—Kusner & Jaffe; Michael A. Centanni

(57) ABSTRACT

A roller for a conveyor system is comprised of a body portion that is generally cylindrical and rotatable about a central axis. A first bearing surface is defined around the body portion. A second bearing surface is raised above the first bearing surface and is generally concentric to the first bearing surface, the second bearing surface being more resilient than the first bearing surface.

12 Claims, 5 Drawing Sheets

SELF-ADJUSTING CONVEYOR SYSTEM

RELATED APPLICATIONS

This application claims the benefit of U.S. Provisional Application No. 60/816,542, filed Jun. 26, 2006, which is fully incorporated herein by reference.

FIELD OF THE INVENTION

The present invention relates generally to conveyor systems and, more particularly, to a roller assembly for a conveyor system.

BACKGROUND OF THE INVENTION

The present invention relates to a conveyor system and roller assembly that is particularly applicable for use in a multi-chamber washer and shall be described with reference thereto. It being understood, however, that a conveyor system or roller assembly according to the present invention may find advantageous application in other applications.

A multi-chamber washer is generally comprised of several different chambers that are aligned side-by-side. Each chamber has a specific purpose, such as washing, rinsing, or drying a load.

Objects washed within a multi-chamber washer are typically contained within an open basket or tray. A conveyor system is provided within the washer to move the basket or tray from one chamber to another. The conveyor system typically extends through the adjacent chambers within the washer to convey a basket or rack to the respective chambers.

Conveyor systems comprised of driven rollers have been used to convey the baskets or trays through a multi-chamber washer. One problem with such conveyor systems is maintaining a sufficient driving force between the baskets and the rollers. In this respect, different types of baskets may be used within the multi-chamber washers. Baskets having a base formed of plastic materials are often used in such washers to reduce noise during the conveying, i.e., indexing, of the baskets. Plastic material also makes it easier to control the friction coefficient between the baskets and the drive rollers. Other manufacturers form baskets of stainless steel material. Stainless steel racks are more easily cleaned during the washing process and are able to heat more quickly because of the higher coefficient of thermal conduction.

It is also known to form the conveyor rollers of a plastic or metal material. As indicated above, rollers formed of plastic material can provide a better coefficient of friction between the roller and the basket and, likewise, help reduce noise during the conveying, indexing process. However, as noted above, plastic rollers are more difficult to clean, as compared to metal rollers. Metal conveyor rollers are preferred because of the ability to clean such rollers during the washing process, as well as their durability. However, maintaining adequate driving force between a metal roller and a metal frame of a basket can be difficult, particularly in wet environments that would be encountered within the washer. Similarly, the friction coefficient between a metal roller and a metal basket will vary depending upon the weight of the basket and the articles therein.

The present invention overcomes these and other problems and provides a roller assembly for a conveyor system having improved frictional, driving characteristics.

SUMMARY OF THE INVENTION

In accordance with a preferred embodiment of the present invention, there is provided a conveyor roller for a conveyor system. The roller is comprised of a body portion that is generally cylindrical and rotatable about a central axis. A first bearing surface is defined around the body portion. A second bearing surface is raised above the first bearing surface and is generally concentric to the first bearing surface, the second bearing surface being more resilient than the first bearing surface.

In accordance with another aspect of the present invention there is provided a roller for a conveyor system in a multi-chamber washer, the conveyor system being operable to convey a rack along a path within the multi-chamber washer. The roller is comprised of an outer roller section that is generally cylindrical in shape with a planar inner surface having an annular grove formed therein. The groove defines an inner portion and an outer portion of the inner surface, the inner portion extending above said inner surface. An inner roller is section generally cylindrical in shape with a planar inner surface having an annular grove formed therein. The groove defines an inner portion and an outer portion of the inner surface, said inner portion extending above the inner surface. The inner portion of the inner roller is dimensioned to mate with the inner portion of the outer roller whereby the annular grove and the outer portion in the inner roller and the annular grove and the outer portion in the outer roller form an opening therebetween. A friction element is disposed between the outer roller and the inner roller. The friction element is dimensioned to be retained in the opening. The friction element is generally cylindrical in shape with a outer cylindrical portion having a diameter greater than an outer diameter of the outer roller and the inner roller such that the outer cylindrical portion extends above the outer diameter of the outer roller and the outer diameter of the inner roller, the friction element being formed of a resilient material.

An advantage of the present invention is a conveyor roller that can be used in multi-chamber washers for conveying metal or plastic baskets within the washer.

Another advantage is a conveyor roller as described above that is less likely to slip.

Another advantage of the present invention is a conveyor roller as described above having improved frictional contact with an article to be conveyed.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENTS

Figure 1:
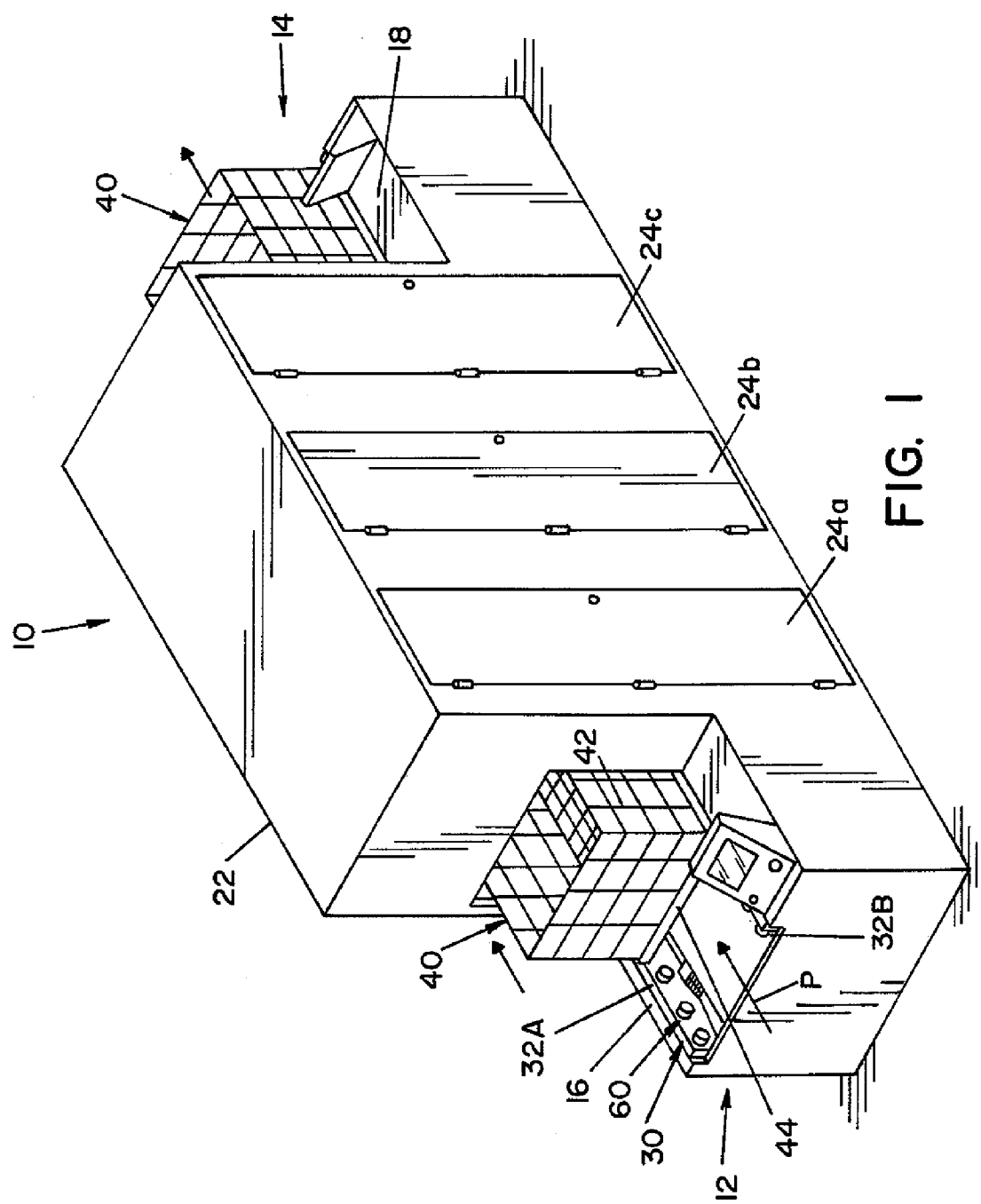
FIG. 1 is a perspective view of a multi-chamber washer.

Referring now to the drawings wherein the showings are for the purpose of illustrating a preferred embodiment of the invention only, and not for the purpose of limiting same, FIG. 1 shows a multi-compartment washer 10.

Washer 10 has a loading end 12 and an unloading end 14. A loading platform 16 is provided at loading end 12 of washer 10, and an unloading platform 18 is provided at unloading end 14 of washer 10. Washer 10 includes an outer housing 22 that is generally rectangular in shape. In the embodiment shown, housing 22 has three access panels 24a, 24b, 24c to allow access to components of washer 10 within housing 22.

A conveyor system 30 defines a path P through washer 10. Conveyor system 30 is comprised of spaced-apart, first and second rows 32A, 32B of spaced-apart conveyor roller assembly 60 (See FIG. 2). Conveyor roller assemblies 60 in each row 32A, 32B are linearly aligned. Conveyor system 30 is designed to convey a basket 40 through washer 10. Basket 40 is generally rectangular in shape, having an opened upper end for receiving articles to be washed. In the embodiment shown, basket 40 is comprised of a plurality of connected wire rods 42 that are attached to a bottom frame 44, having a rectangular cross-section, best seen in FIGS. 3 and 4.

Figure 2:
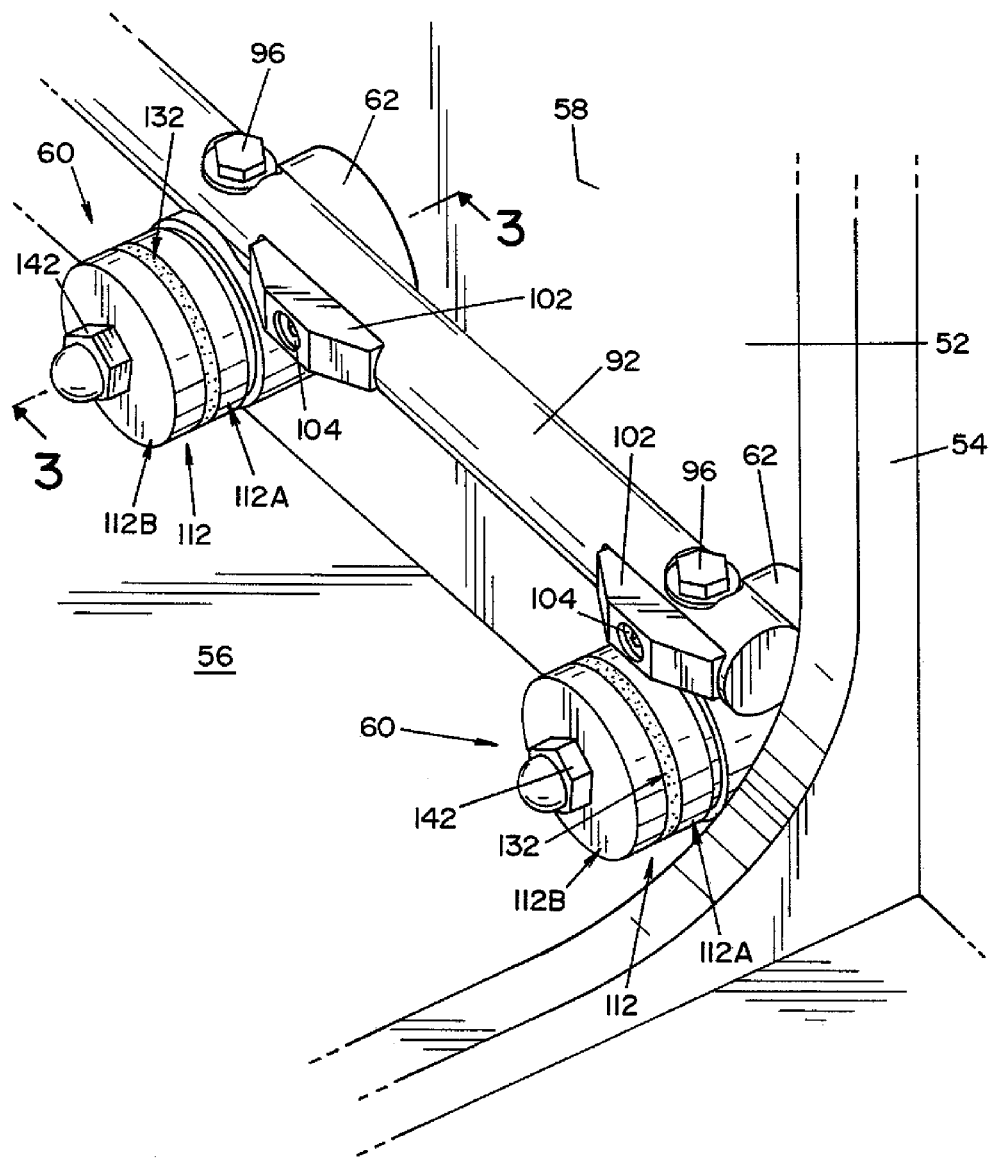
FIG. 2 is a perspective view of a chamber within the multi-chamber washer shown in FIG. 1, illustrating a portion of a conveyor system.

Referring now to FIG. 2, a pair of spaced-apart conveyor roller assemblies 60 is shown within one washer compartment 52. Washer compartment 52 is basically defined by spaced-apart bulkheads 54, an inner floor panel 56, and inner side panels 58.

Each roller assembly 60 is dimensioned for mounting to inner side panel 58 of housing 22. Each roller assembly 60 includes a mounting block 62 that is dimensioned to be attached to inner side panel 58 of housing 22.

Figure 3:
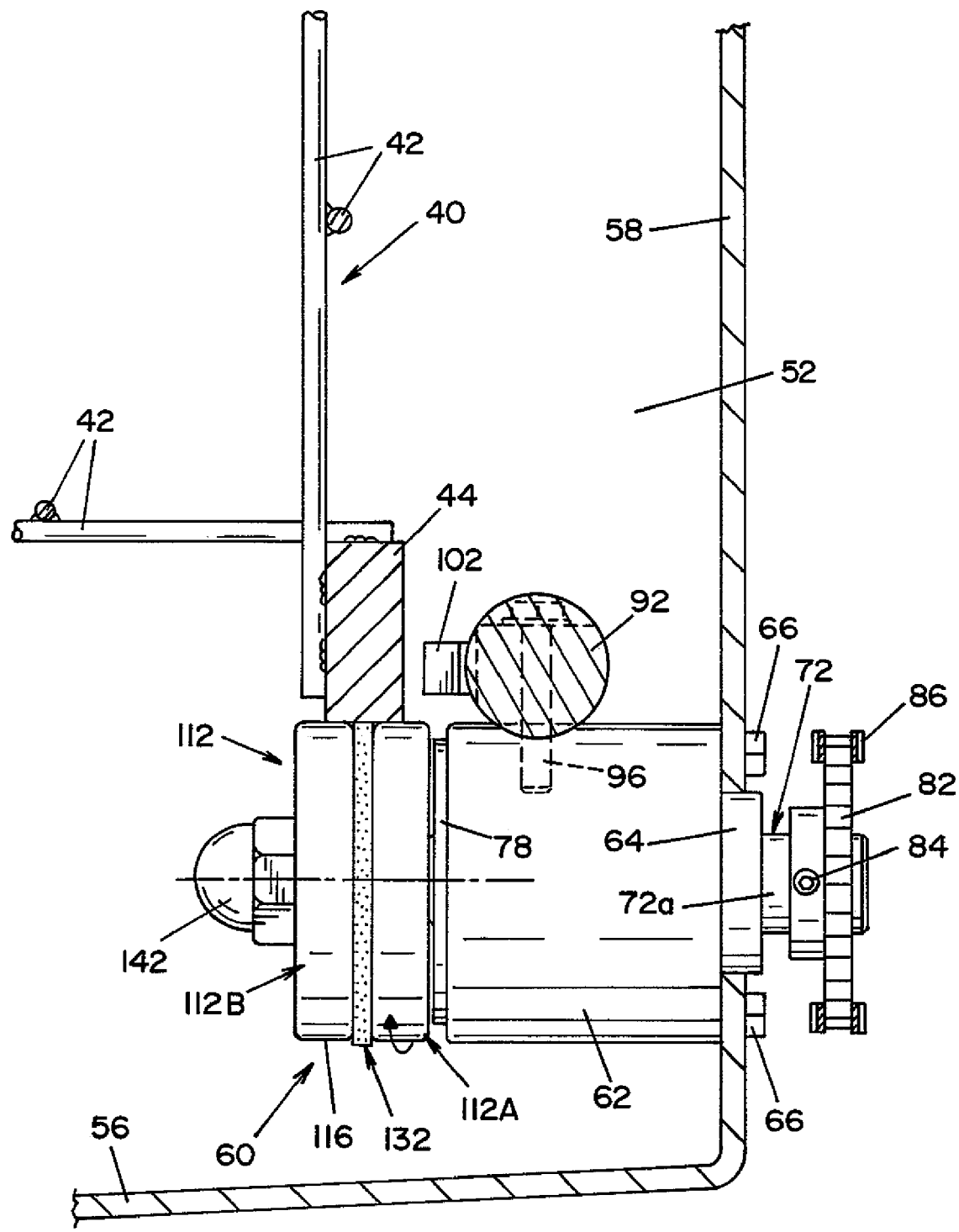
FIG. 3 is a view taken along lines 3-3 of FIG. 2, showing one edge of a basket supported on a conveyor roller assembly.
Figure 4:
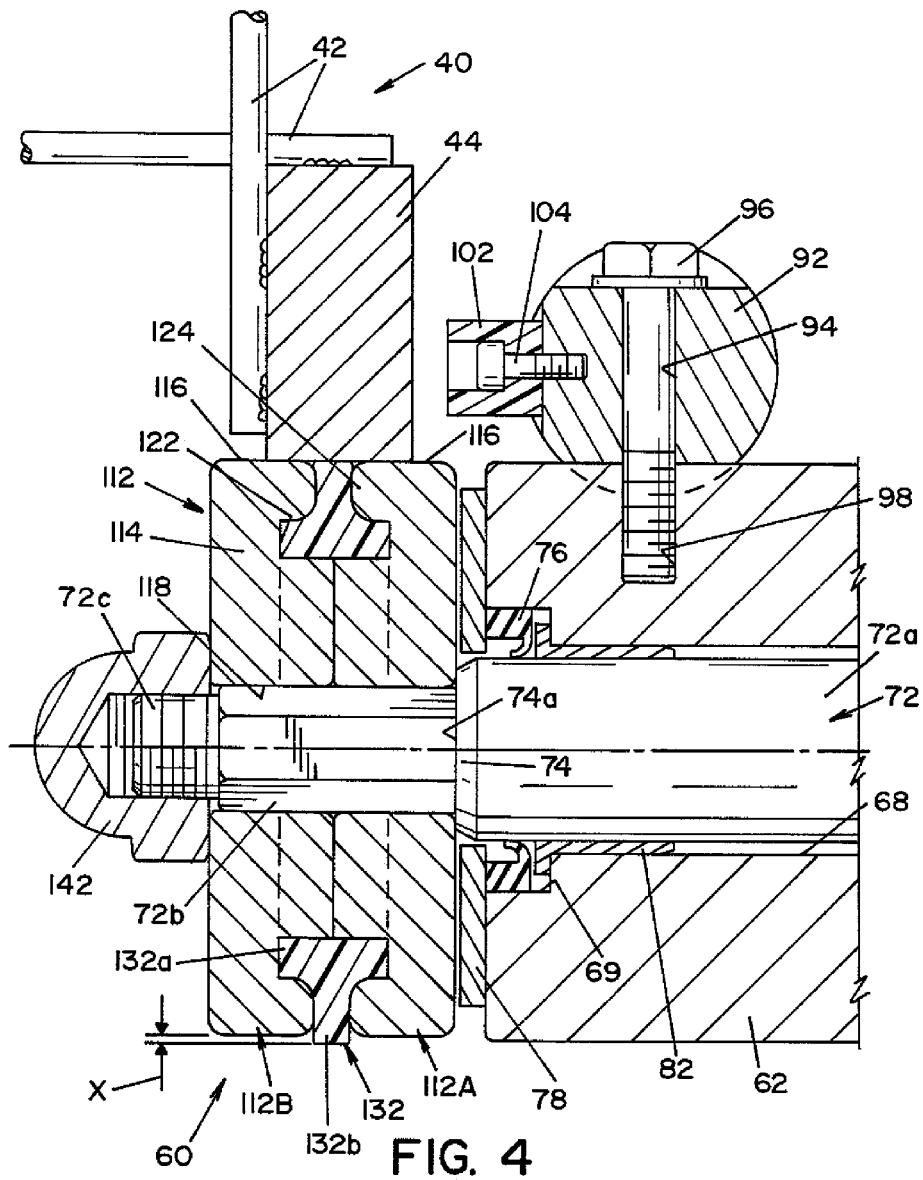
FIG. 4 is an enlarged sectional view of the conveyor roller shown in FIG. 3.

Mounting block 62 is generally cylindrical in shape and includes a cylindrical mounting boss 64 extending from one end thereof (See FIG. 3). Mounting boss 64 is dimensioned to extend through an opening within side panel 58 of housing 22. Conventional fasteners 66 extend through openings in side panel 58 and are threaded into holes (not shown) in the end of mounting block 62 to secure mounting block 62 to side panel 58, as illustrated in FIG. 3. As best seen in FIG. 4, a cylindrical bore 68 extends through mounting block 62 and mounting boss 64. A cylindrical recess 69 (best seen in FIG. 4) is counter-bored into one end of mounting block 62, as illustrated in FIG. 4.

A shaft 72 is dimensioned to be positioned within cylindrical bore 66 in mounting block 62. Shaft 72 includes an elongated, cylindrical body portion 72a, having a cylindrical shank portion 72b axially extending therefrom. Shank portion 72b has threaded end portion 72c, best seen in FIG. 4. Shank portion 72b is smaller in diameter than body portion 72a, such that a shoulder 74, having an annular surface 74a, is formed where shank portion 72b meets body portion 72a. As illustrated in FIG. 4, cylindrical bushings 82 are disposed between body portion 72a of shaft 72 and the inner surface of bore 68 in cylindrical block 62. An annular seal element 76 is disposed within recess 69. A retaining plate 78 is mounted to the end of mounting block 62 to capture seal 76 within annular recess 69. Fastening means (not shown) attach the retaining plate to mounting block 62.

Body portion 72a of shaft 72 extends outward from mounting boss 64 of mounting block 62, as best seen in FIG. 3. The extending portion of body portion 72a of shaft 72 is dimensioned to receive a sprocket gear 82. In the embodiment shown, sprocket gear 82 is attached to the end of shaft 72 by a setscrew 84. Sprocket 82 is driven by a drive chain or belt 86 that forms part of a drive system (not shown) for driving roller assemblies 60, as shall be described in greater detail below.

Mounting block 62 is dimensioned to support a rail 92 along the upper edge thereof. In the embodiment shown, rail 92 is an elongated cylindrical rod that extends through washer 10. Rail 92 has a cylindrical bore 94 extending transversely therethrough (See FIG. 4). Bore 94 is dimensioned to receive a conventional fastener 96 that is received within a threaded opening 98 (best seen in FIG. 4) within mounting block 62. Guide members 102 are attached to the lateral sides of rail 92 by fasteners 104, as best seen in FIG. 4.

A roller 112 is mounted to shank portion 72b of shaft 72. In the embodiment shown, roller 112 is comprised of an inner roller section 112A, an outer roller section 112B, and a friction element 132. In the embodiment shown, inner roller section 112A and outer roller section 112B are essentially identical. Each roller section 112A, 112B is basically a cylindrical disc 114, having a cylindrical outer surface 116 and a central, hexagonal-shaped opening 11 S extending through disc 114 (See FIG. 5). An annular groove 122 is formed within a side surface of each roller section 112A, 112B. Annular groove 122 defines an annular wall or ridge 124 that defines the periphery of each cylindrical disc 114. In the embodiment shown, annular wall 124 is dimensioned wherein the width of cylindrical surface 116 is less than the overall thickness of roller section 114. Openings 118 in roller sections 112A, 112B are dimensioned to receive shank portion 72b of shaft 72. When the first and second roller sections 112A, 112B are assembled together on shaft 72, annular grooves 122 formed therein are facing each other. As best seen in FIG. 4, a generally T-shaped, annular slot is defined therebetween.

Figure 5:
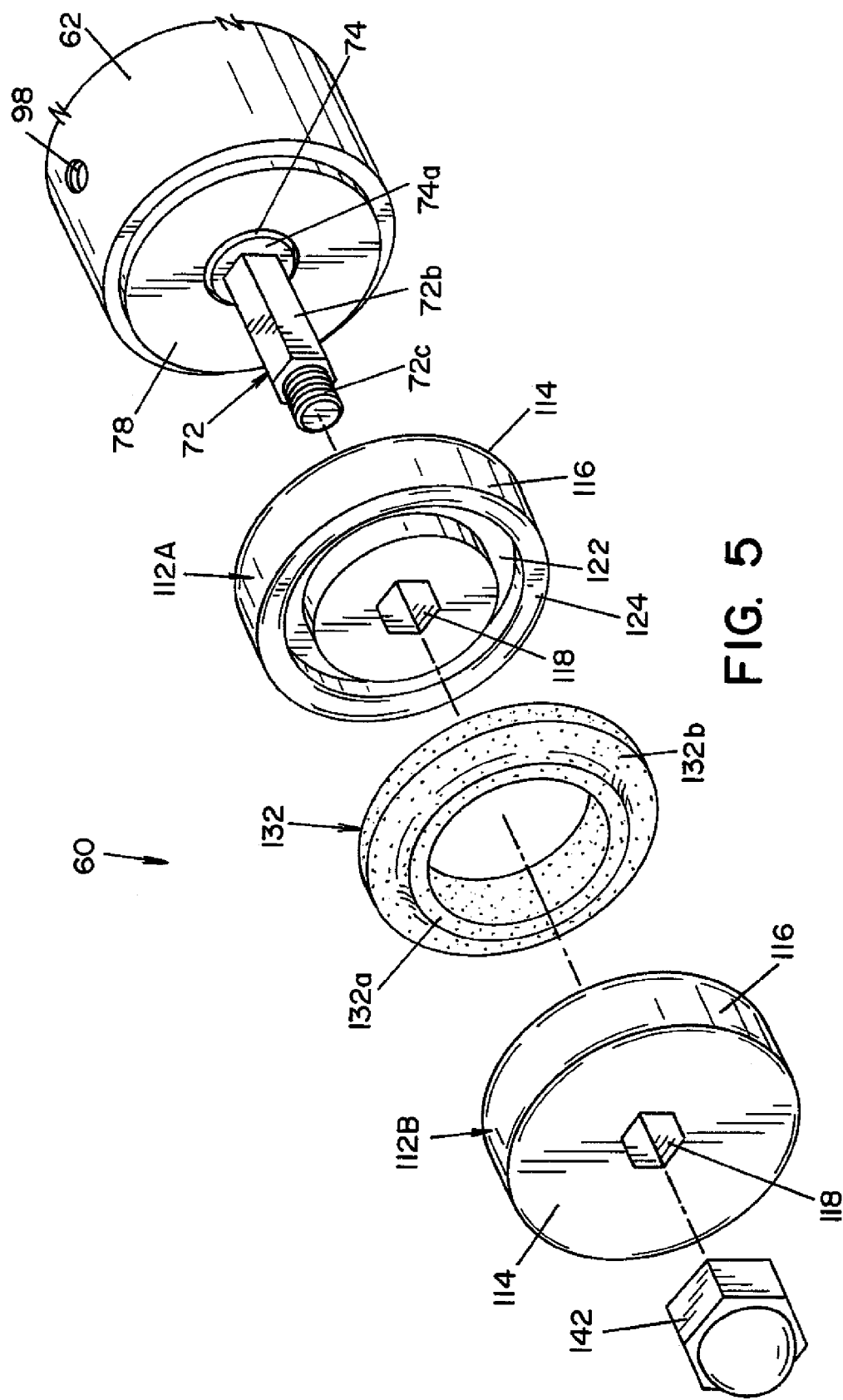
FIG. 5 is an exploded view of a conveyor roller assembly.

The slot is dimensioned to receive and capture an annular friction element 132 best seen in FIGS. 4 and 5. Friction element 132 has a generally T-shaped cross section. Friction element 132 includes a base portion 132a and a radially extending wall portion 132b. Wall portion 132b is dimensioned to extend slightly beyond cylindrical surfaces 116 of roller sections 112A, 112B when friction element 132 is captured therebetween. As illustrated in the bottom of FIG. 4, radially extending wall portion 132b of friction element 132 extends a dimension "X" above cylindrical surfaces 116 of roller sections 112A, 112B. Friction element 132 is preferably formed of a resilient elastomeric material. In one embodiment, friction element 132 is formed of a silicone material, code 1104X, 75 DURO, SHORE A. Friction element 132 may be formed of other soft, rubber materials, such as, by way of example and not limitation, ethylene propylene diene monomer (EPDM) rubber. Roller sections 112A, 112B are mounted to the shank portion of the shaft by a conventional cap-nut 142 threaded onto threaded end portion 72c of shaft 72 (See FIG. 5). Fastener nut 142 forces roller sections 112A, 112B against an annular surface 74a of shoulder 74 on shaft 72.

Referring now to the operation of roller assembly 60, chain drive 86 on conveyor system 30 simultaneously rotates sprocket gear 82 of each roller assembly 60. Rotation of sprocket gear 82 causes corresponding shaft 72 and roller 112 attached to shaft 72 to rotate in a pre-determined direction. FIGS. 3 and 4 show a typical metal basket 40 supported by a conveyor roller assembly 60. As illustrated in FIGS. 3 and 4, roller assemblies 60 are dimensioned to engage and support the lower frame portion 44 of a basket 40. As illustrated in the drawings, inner and outer roller sections 112A, 112B, being comprised of stainless steel, provide stable support for basket 40 thereon. Friction element 132, being formed of a soft, resilient material, improves the traction between basket 40 and roller 112. In this respect, resilient, friction element 132 of roller 112 maintains surface contact with basket 40, thereby providing improved frictional contact therewith. In the event basket 40 is heavy, resilient, flexible frictional material will compress until the weight of the basket is borne by the metal roller sections 112A, 112B. Resilient friction element 132 will remain in contact with frame 44 of basket 40, thereby improving the frictional contact therewith. With base portion 132a of friction element 132 being wider, friction element 132 is held in place by inner and outer roller sections 112A, 112B.

The present invention thus provides a composite roller having metal sections for providing firm support of objects and a resilient strip extending from the surface of the roller sections to provide better contact and frictional engagement with the underside of the objects.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A roller for a conveyor system in a multi-chamber washer, said conveyor system operable to convey a rack along a path within said multi-chamber washer, said roller comprised of:
   an outer roller section generally cylindrical in shape with a planar inner surface having a boss and an annular protrusion extending therefrom, said boss and said annular protrusion defining an annular groove therebetween, said boss extending above said annular protrusion;
   an inner roller section generally cylindrical in shape with a planar inner surface having a boss and an annular protrusion extending therefrom, said boss and said annular protrusion defining an annular groove therebetween, said boss extending above said annular protrusion said boss of said inner roller mating with said boss of said outer roller whereby said annular groove and said annular protrusion in said inner roller and said annular groove and said annular protrusion in said outer roller form an opening therebetween;
   a friction element disposed between said outer roller and said inner roller, said friction element dimensioned to be retained in said opening, said friction element being generally cylindrical in shape with a outer cylindrical portion having a diameter greater than an outer diameter of said outer roller and said inner roller such that said outer cylindrical portion extends above said outer diameter of said outer roller and said outer diameter of said inner roller, said friction element formed of a resilient material.

2. A roller as described in claim 1, wherein said outer roller and said inner roller have an opening extending along a central axis.

3. A roller as descried in claim 1, wherein said friction element is silicone.

4. A roller as described in claim 1, wherein said outer roller and said inner roller are stainless steel.

5. A roller for a conveyor system, said roller comprising:
   a body portion that is generally cylindrical and rotatable about a central axis, said body portion comprised of an outer roller section and an inner roller section, each of said outer roller section and said inner roller section with a planar inner surface having a boss and an annular protrusion extending therefrom, said boss and said annular protrusion defining an annular groove therebetween, said boss extending above said annular protrusion, said boss of said inner roller dimensioned to mate with said boss of said outer roller whereby said annular groove and said annular protrusion in said inner roller and said annular groove and said annular protrusion in said outer roller form an annular slot therebetween;
   a first bearing surface defined around said body portion, said first bearing surface comprised of an outer cylindrical surface of said inner roller section and an outer cylindrical surface of said inner roller section;
   a second bearing surface raised above said first bearing surface and disposed between said outer cylindrical surface of said inner roller section and said outer cylindrical surface of said outer roller section, said second bearing surface generally concentric to said first bearing surface, wherein said second bearing surface is more resilient than said first bearing surface.

6. A roller for a conveyor system as defined in claim 5, wherein said body portion is dimensioned to receive a shaft, such that said shaft lies along said central axis.

7. A roller for a conveyor system as defined in claim 5, wherein said shaft is fixed within said body portion.

8. A roller for a conveyor system as defined in claim 5, wherein said body portion is formed of a metallic material.

9. A roller for a conveyor system as defined in claim 5, wherein said second bearing surface is defined by an annular friction element.

10. A roller for a conveyor system as defined in claim 9, wherein said friction element is comprised of at least one of the following materials: silicone, ethylene propylene diene monomer, and a combination thereof.

11. A roller for a conveyor system as defined in claim 9, wherein said friction element is dimensioned to be received by said annular slot defined within said body portion.

12. A roller for a conveyor system as defined in claim 11, wherein said friction element is T-shaped and said annular slot is T-shaped.

* * * * *

UNITED STATES PATENT AND TRADEMARK OFFICE
Certificate

Patent No. 7,475,765 B2                                        Patented: January 13, 2009

ON petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Erik Nadeau, Quebec, (CA); Serge Coulombe, Boischatel (CA); and Yvan Béland, Quebec (CA).

Signed and Sealed this Twelfth Day of July 2011.

GENE CRAWFORD
*Supervisory Patent Examiner*
Art Unit 3651
Tecnology Center 3600